(No Model.)

J. W. KLEMM.
RAKE.

No. 582,531. Patented May 11, 1897.

Witnesses:
F. D. Goodwin
Murray C. Boyer

Inventor:
John W. Klemm
by his Attorneys
Howson & Howson

UNITED STATES PATENT OFFICE.

JOHN W. KLEMM, OF PHILADELPHIA, PENNSYLVANIA.

RAKE.

SPECIFICATION forming part of Letters Patent No. 582,531, dated May 11, 1897.

Application filed August 24, 1896. Serial No. 603,766. (No model.)

*To all whom it may concern:*

Be it known that I, JOHN W. KLEMM, a citizen of the United States, residing in Philadelphia, Pennsylvania, have invented certain Improvements in Rakes, of which the following is a specification.

The object of my invention is to so construct a rake that the stem, shank, or tang of the same will be integral with the back bar of the rake-head instead of being secured thereto by welding, and this object I attain in the manner hereinafter set forth, reference being had to the accompanying drawings, in which—

Figure 1:
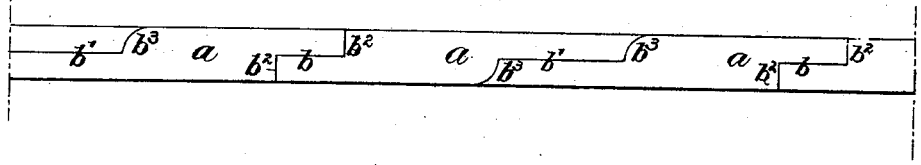
Figure 2:
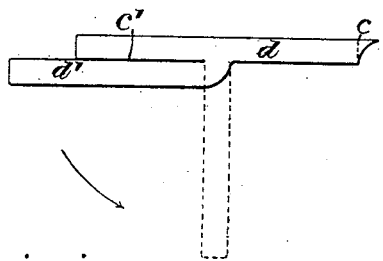
Figure 3:
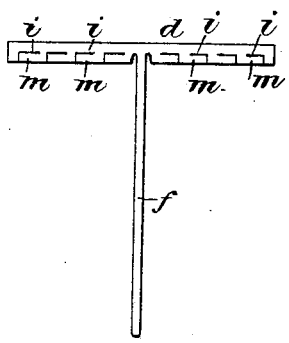
Figure 4:
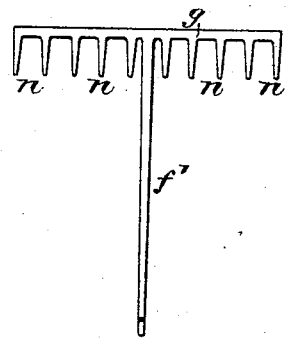
Figure 5:
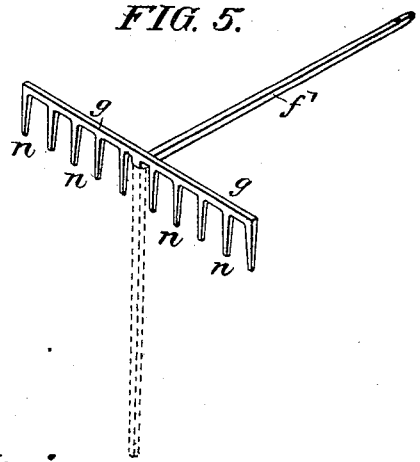

Figure 1 is a view of a bar, showing the manner of cutting the blanks therefrom. Fig. 2 is a view of one of said blanks, illustrating the first step in the operation of forming the rake therefrom; and Figs. 3, 4, and 5 are views illustrating further steps in the operation of forming the rake.

A bar of the proper width and thickness is first cut up into rake-blanks $a$ by cutting it on the lines $b\ b'$, as shown in Fig. 1, the cuts $b$ having right-angled terminations $b^2$ and the cuts $b'$ having segmental terminations $b^3$. Each of these rake-blanks is then trimmed at one end, as shown by the dotted lines $c$ in Fig. 2, and a longitudinal incision $c'$ is formed at the opposite end of the blank, so as to divide the latter into a bar $d$ and a finger $d'$, the latter being then bent around, as indicated by the arrow in Fig. 2, until it assumes a position at right angles to the bar $d$, as shown by dotted lines in said figure, such bending of the finger $d'$ being facilitated by the rounded inner end of the same due to the segmental cut $b^3$, whereby the blank is formed. The finger $d'$ is then drawn down by forging or other suitable means into a primary form of shank or stem $f$, as shown in Fig. 3, and in the bar $d$ are formed a series of incisions $i$, so as to divide such bar into a series of fingers $m$, as also represented in Fig. 3. These fingers $m$ are then bent outward at right angles to the bar $d$ and are drawn down by forging or otherwise so as to form the teeth $n$ of the rake, the bar $d$ becoming the back $g$ of the rake-head and the shank $f$ being at the same time drawn down into the form of the finished stem or shank $f'$, as shown in Fig. 4. This stem or shank still projects from the back bar $g$ of the rake-head in the same direction as the teeth, and in order to bring it into the proper relation with the rake-head it is bent, as indicated in Fig. 5, so as to project upwardly and rearwardly at the desired angle from the bottom of the back bar $g$ of the rake-head, there being a sharp curve or bend immediately adjacent to said back bar. By this means the stem or shank of the rake is formed integral therewith, and the rake is adapted for use in laying asphalt pavements and for other purposes where the rake is subjected to heat, it having been found that rakes having heads with stems or shanks welded thereto are not available for such use, the heat destroying the weld and causing the separation of the rake-head and shank.

By carrying the stem or shank rearwardly from the under side of the back bar of the rake the top of said back bar presents a projecting straight edge which can be used for leveling or smoothing the asphalt or other composition after it has been laid—a result which cannot be attained when the stem of the rake projects from the outer portion of the back bar, as usual.

Having thus described my invention, I claim and desire to secure by Letters Patent—

1. A rake having a head comprising a back bar with projecting teeth, and a stem or shank formed integral with said back bar and bent rearwardly from the under side of the same, substantially as specified.

2. A rake-blank consisting of a bar having teeth projecting from one side of the same, and a central elongated stem or shank projecting from the same side of the bar as the teeth, substantially as specified.

In testimony whereof I have signed my name to this specification in the presence of two subscribing witnesses.

JOHN W. KLEMM.

Witnesses:
EDWD. RAMSEY,
MURRAY C. BOYER.